United States Patent [19]
Patrick et al.

[11] 3,867,633
[45] Feb. 18, 1975

[54] WIDE ANGLE VIEWING SYSTEM FOR LIMITED VISIBILITY CONDITIONS

[75] Inventors: Thomas R. Patrick, Austin; Joe H. Keahey, Lewisville, both of Tex.

[73] Assignee: Texas Instruments Incorporated, Dallas, Tex.

[22] Filed: May 15, 1973

[21] Appl. No.: 360,481

Related U.S. Application Data

[63] Continuation-in-part of Ser. No. 209,221, Dec. 17, 1971, abandoned.

[52] U.S. Cl.................. 250/334, 250/338, 250/347, 250/349, 250/353
[51] Int. Cl. ............................................. G01t 1/16
[58] Field of Search ........... 250/334, 236, 338, 347, 250/349, 353

[56] References Cited
UNITED STATES PATENTS

| | | | |
|---|---|---|---|
| 2,873,381 | 2/1959 | Lauroesch | 250/236 |
| 2,968,735 | 1/1961 | Kaufold et al. | 250/236 |
| 3,211,046 | 10/1965 | Kennedy | 250/236 |
| 3,287,559 | 11/1966 | Barnes | 250/334 |
| 3,562,529 | 2/1971 | Engborg | 250/334 |
| 3,786,269 | 1/1974 | Cooper | 250/334 |

*Primary Examiner*—Harold A. Dixon
*Attorney, Agent, or Firm*—Harold Levine; Rene E. Grossman; Alva H. Bandy

[57] ABSTRACT

A system for the navigation of vehicles under conditions of limited visibility is disclosed. The system provides a means whereby an image of the outside world (e.g., terrain, water surface, celestial areas) is produced and projected on a screen visible to the operator of the vehicle by an infrared system which scans the area of interest around the vehicle. A wide angle of view is provided by scanning the area of interest in two parts using first and second scan cycles. The image produced during the first scan cycle is projected on the upper portion of the screen and the image provided during the second scan cycle is projected on the lower portion of the screen with the two images interfacing so as to produce a continuous image of the scanned scene.

By confining the scan angle of the system to 180°, one array of detectors may be used for both scan cycles. The field of view of the optics associated with the system is automatically switched between the two scan cycles as the system rotates to scan the scene of interest.

11 Claims, 16 Drawing Figures

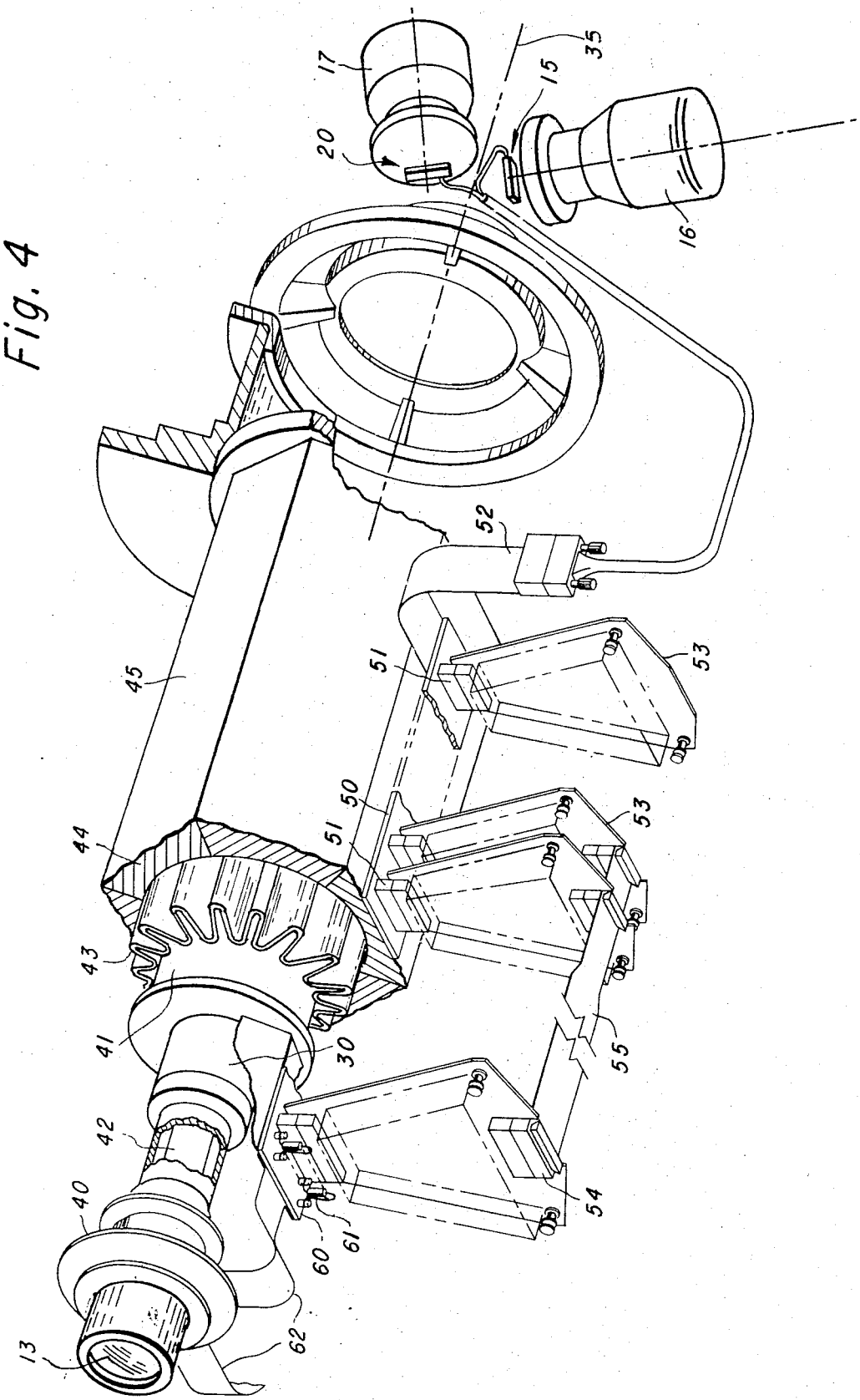

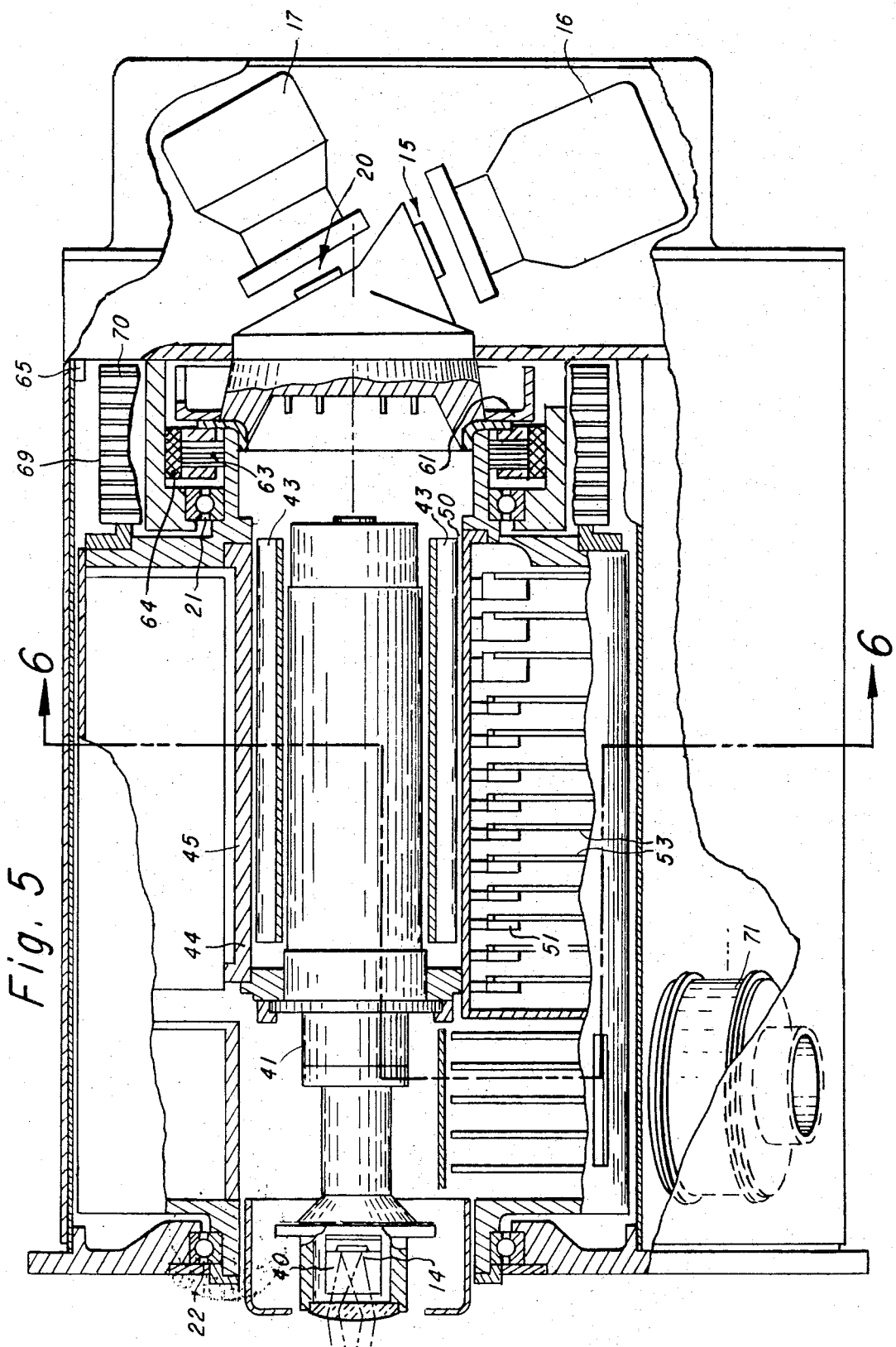

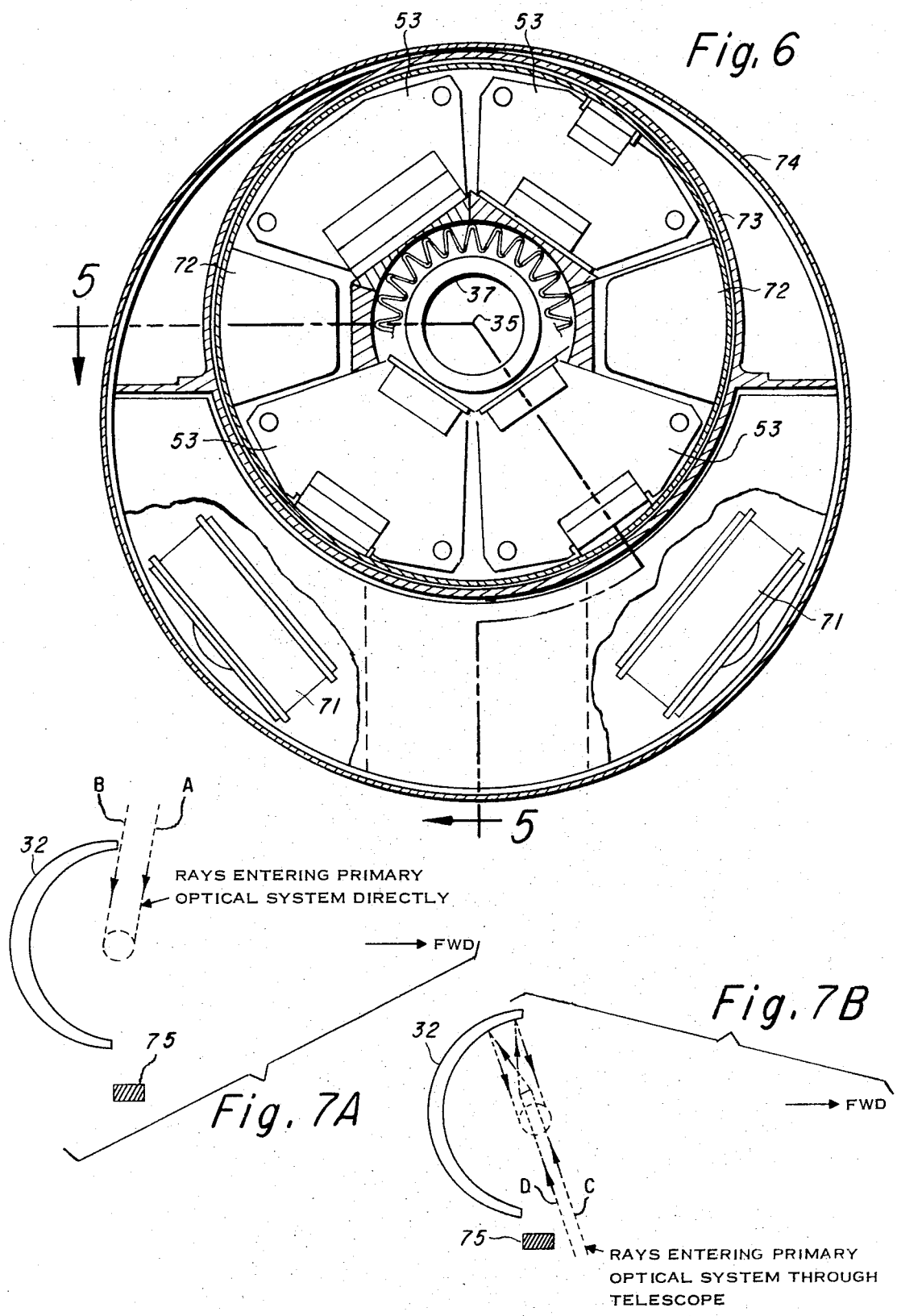

WIDE ANGLE VIEWING SYSTEM FOR LIMITED VISIBILITY CONDITIONS

This is a continuation-in-part of Application Ser. No. 209,221 filed Dec. 17, 1971 and now abandoned

SUMMARY OF THE INVENTION AND BACKGROUND INFORMATION

This invention relates to apparatus and methods for optical scanners and more particularly to an infrared scanner system for use as an aid in navigating vehicles under conditions of limited visibility.

Prior art aids to navigation under conditions of limited visibility have been limited primarily to radio beacons and radar systems. These systems are generally limited to providing bearing information of features of the terrain over which the vehicle is to be navigated. These characteristics generally prevent these systems from being used to land aircraft, for example, under near zero visibility conditions because the systems do not provide adequate height information related to the features of the terrain. For example, these systems do not ordinarily provide height information related to buildings or other obstacles which may be in the path of the aircraft. Additionally, many of these systems require equipment to be positioned on the ground as well as in the aircraft. This feature makes these systems difficult to set up in remote locations. By contrast, the systems disclosed according to the present invention provide an image of the terrain which includes accurate height and angular information of all of the visible features of the terrain for an area in the path of the vehicle. This image is provided by an infrared scanner which scans the terrain in the path of the vehicle and generates an image which is a reproduction of the features of the terrain. This reproduction of the terrain is projected onto a screen for viewing by the operator of the vehicle.

Accordingly, an object of this invention is to provide a system for aiding in the navigation of a vehicle under conditions of low visibility.

Another object of the invention is to provide a system permitting aircraft to be operated under conditions of near zero visibility.

Another object of the invention is to provide a passive system permitting vehicles to be operated under conditions of poor visibility.

Another object of the invention is to provide a viewing system for scanning an area of interest in two parts to form signals from which a composite image of the scene of interest can be reproduced.

Another object of the system is to provide a viewing system for scanning the terrain along the path of navigation of a vehicle and producing an image of said terrain.

Another object of the invention is to provide a viewing system for scanning an area of interest in one part to form signals from which an image of the scene of interest can be reproduced.

The term "vehicle" as used herein includes any propelled conveyance including for example aircraft, land vehicles, ships and boats.

In one embodiment of the invention, infrared radiation from the scene of interest is deflected by a mirror and focused onto an array of infrared detectors by a lens system. The array of detectors, the lens and the mirror are rotated about an axis normal to the optical axis of the array of detectors thereby causing the array of detectors to scan the terrain in the path of the vehicle. A circular mirror limits the field of view of the lens to 180°. The scanner is positioned to look forward and scan equal areas on either side of the axis of the vehicle. The circular mirror also reflects the field of view of the detector such that the terrain in front of the vehicle is scanned twice for each 360° rotation of the detector array with the field of view during these two scan cycles being positioned such that the lower edge of the field of view of one scan cycle is coincident with the upper edge of the field of view of the second scan cycle. This effectively increases the field of view of the scanner over the area of interest. The output signals of the detector array are amplified and coupled to two arrays of light emitting diodes. The first array of light emitting diodes produces an image of the portion of the scene which is within the field of view of the system during the first scan cycle. The second array produces an image of the portion of the scene which is within the field of view of the scanner during the second scan cycle. The output of the light emitting diode arrays is focused on a screen to produce an image of the scene viewed.

In another embodiment, two lens systems are focused on the array of light sensitive diodes and the fields of view of these two lens systems are deflected by a combination of prisms and mirrors such that the fields of view of the two lens systems are positioned from each other by 180° in the vertical plane but less than 180° in the horizontal plane. A spherical mirror is positioned such that the field of view of one of the lens systems is always blocked by the spherical mirror. The output signals of the light sensitive diode array are amplified and coupled to two arrays of light emitting diodes. The output of one of the arrays of light emitting diodes is focused upon the top portion of the screen to reproduce an image of the scene as viewed by one of the lenses and the output of the second array of light emitting diodes is focused on the lower portion of the screen to reproduce an image of the scene viewed by the second lens system. Since the field of view of the two lens systems are less than 180° with respect to each other in the vertical plane, these fields of view can be positioned such that the angle of view of the system is substantially equal to the sum of the angle of view of the two lens systems. This produces an image of the scene viewed by a system with the field of view of the system substantially equal to the sum of the fields of view of the two lenses.

In yet another embodiment of the invention a single lens system is used to focus infrared energy on an array of detectors. Two deflection mirrors are then positioned within the field of view of the lens to divide the field of view into two parts positioned 180° with respect to each other in the vertical plane and less than 180° with respect to each other in the horizontal plane. A spherical mirror is then positioned such that it will always prevent infrared radiation from impinging on one of the deflection mirrors. The output of the array of detectors is amplified and coupled to two arrays of light emitting diodes. The output of one of the arrays of light emitting diodes is focused upon a screen to reproduce an image of the scene viewed when the mirror producing the highest angle of view is not blocked by the spherical mirror. The output of the second array of light emitting diodes is focused upon the lower portion of the screen to reproduce an image of the scene viewed when the mirror producing the lower angle of view is not blocked by the spherical mirror. The mirrors are adjusted such that these two images join to produce a wide angle view of the scene scanned by the system.

In still another embodiment of the invention, two lens systems are focused on the array of light sensitive diodes and the fields of view of these two lens systems are deflected by a combination of prisms and mirrors such that the fields of view of the two lens systems are interlaced to provide adjacent scan lines belonging to different fields of view. The housing for the lens systems includes an infrared admitting window to provide the desired field of view, i.e., a circular window may be used to provide a 360° field of view; however, as shown, the window provides a 180° field of view in the forward direction. To eliminate noise from the non-scanning lens system, i.e., the lens system not passing before the window, the housing interior is provided with a substantially uniform temperature radiating material. The output signals of the light sensitive diode array are amplified and coupled to an array of light emitting diodes. The output of the array of light emitting diodes is passed through two lens systems to a display screen to provide a wide screen wrap around display satisfactory for use in aircraft flying nap of the earth at night.

DESCRIPTION OF THE DRAWINGS

FIG. 4 is a pictorial view of the rotary portion of the viewing system.

FIG. 5 is a cross-sectional view of the system taken along the horizontal axis.

FIG. 6 is a cross-section view of the rotating portions of the viewer taken at 90° with respect to the axis of rotation.

FIGS. 7A and 7B are top views of a circular mirror.

DETAILED DESCRIPTION

Figure 1:
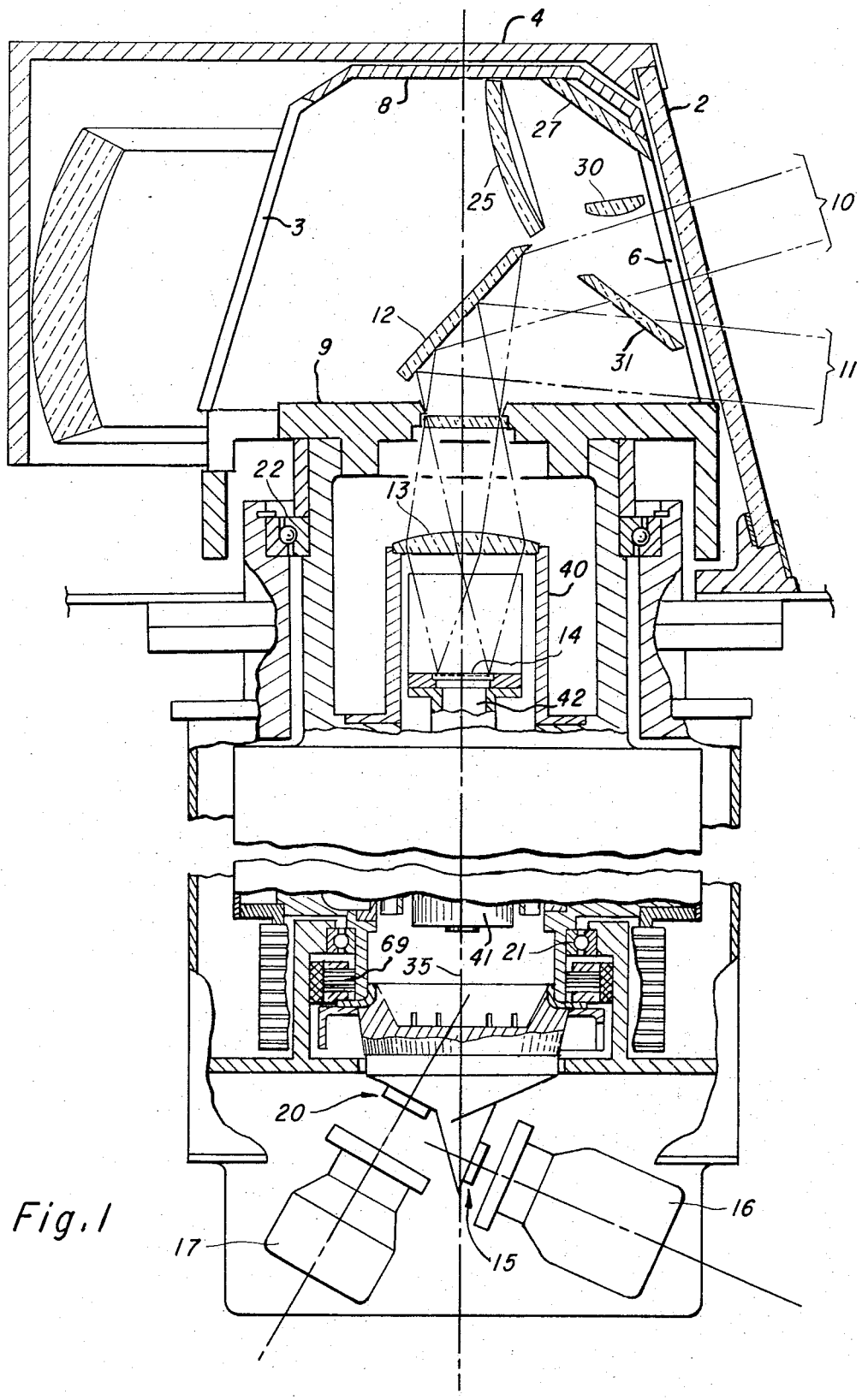
FIG. 1 is a cross-section of one embodiment of the system with the optics positioned in the high angle field of view of position.

Referring now to FIG. 1, radiant energy from the scene being viewed is shown entering the system as ray bundles 10 and 11 through a window 2 in airframe 4. The angle between these two ray bundles 10 and 11 passes through window 6 of optics housing 8 secured to the rotating structure 9. The rays are deflected by mirror 12 also mounted in optics housing 8 and passed through lens 13 which focuses the rays on an array of infrared detectors 14. The output signals from the array of infrared detectors 14 are amplified by circuits (not shown in this view) and coupled to two arrays of transducers such as, for example, light emitting diodes 15 and 20. The output of the arrays of light emitting diodes 15 and 20 are focused onto a display screen by projection optics 16 and 17. The optics, the array of infrared detectors 14 and the arrays of emitters 15 and 20 are coupled to the rotary structure 9 which is supported by bearings 21 and 22. This rotary structure is driven by a motor 69 causing the array of infrared detectors 14 to scan an area which is within the field of view of the system.

Figure 2:
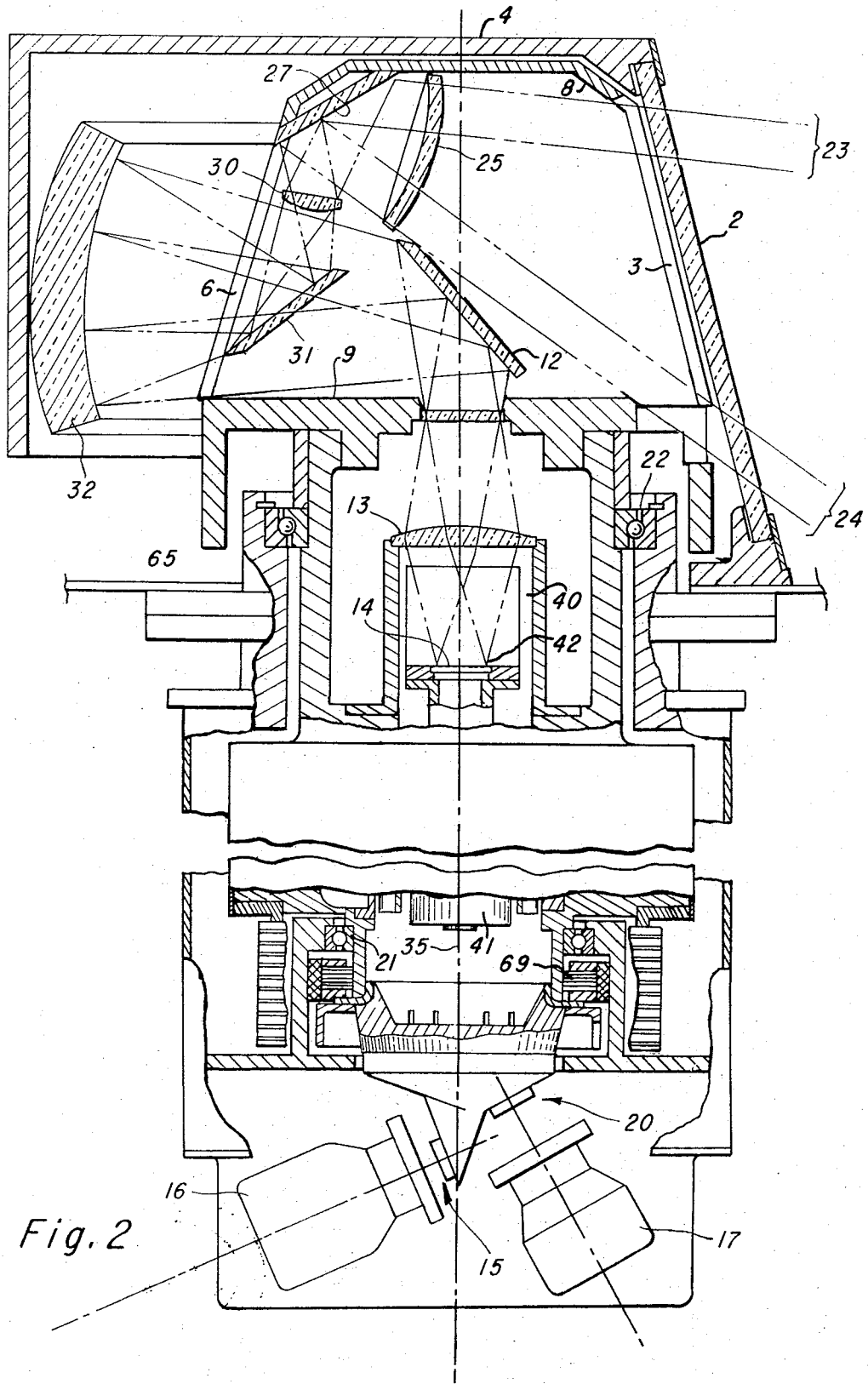
FIG. 2 is a cross-section of the embodiment of FIG. 1 with the optics positioned in the low angle of field of view of position.

Referring now to FIG. 2, there is shown the system of FIG. 1 when the detector array 14 together with optics housing 8 attached to the rotating structure has been rotated by motor 69 to a point where the field of view of the detector array 14 has changed to a lower angle. In this figure, infrared radiation from the scene of interest is represented by ray bundles 23 and 24 which pass through window 2 of airframe 4 and window 3 of optics housing 8, through a lens 25 and impinge upon a first mirror 27. Lens 25 and first mirror 27 are mounted in optics housing 8 for rotation therewith. Mirror 27 reflects these ray bundles 23 and 24 through a second lens 30 also mounted in optics housing 8. After passing through lens 30, the ray bundles 23 and 24 are reflected by another mirror 31, mounted in optics housing 8, through window 6 and impinge upon a spherical mirror 32 rigidly mounted on airframe 4. After being reflected by spherical mirror 32 back through window 6 the rays comprising these bundles impinge upon mirror 12 mounted in optics housing 8 and are deflected through lens 13 and focused thereby onto the array of infrared detectors 14. Upon examination of FIGS. 1 and 2, it can be seen that the angle with respect to axis of rotation 35 of ray bundles 24 and 11 are substantially the same. This permits the signals from the detector array 14 to be amplified and coupled to arrays of light emitting diodes to produce an image of a scene defined by an area extending from ray bundle 24 to ray bundle 10.

Figure 3:
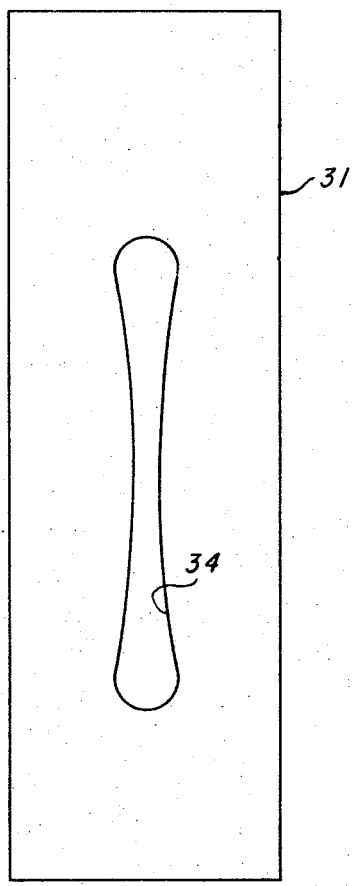
FIG. 3 is a plan view of a reflecting mirror.

Referring now to FIG. 3, these is illustrated a plan view of mirror 31. The reflecting portion of this mirror is illustrated at reference numeral 34. The reflective portion is supported by a larger structure which is transparent to infrared radiation. This structure may be germanium for example. Area 34 is shaped to minimize interference with the infrared energy when the optics are positioned as shown in FIG. 1 and to deflect substantially all infrared radiation within the field of view of the detector array 14 when the optics are positioned as shown in FIG. 2. These characteristics are realizable because when the optics are positioned as shown in FIG. 2, the folding telescope comprising lenses 25 and 30 concentrate the energy from the scene being viewed such that the field of view of the detector array 14 when projected through the optics to the surface of mirror 31 is limited to the reflective area 34 (FIG. 3). By contrast, when the optics are positioned as shown in FIG. 1, the reflective area 34 (FIG. 3) only covers about 15% of the field of view of detector array 14 (FIG. 1) when this field of view is projected to the surface of mirror 31.

The output of the array of infrared detectors 14, as previously discussed, is amplified and coupled to two arrays of light emitting diodes 15 and 20. As shown in FIGS. 1 and 2, these arrays are positioned at different angles with respect to the axis of rotation 35 of the array of infrared detectors 14. The output of the array of light emitting diodes 15 is projected onto a screen by projection optics 16 and 17 such that when the optics are positioned as shown in FIG. 1 an image of a first portion of the scene scanned is produced. When the optics are positioned as shown in FIG. 2 the output of the array of light emitting diode 20 is projected onto a second portion of the screen to produce an image of a second portion of the scene scanned. The relative angle of these arrays of light emitters 15 and 20, the projection optics 16 and 17 and the field of view of the detector array 14 are adjusted with respect to each other and with respect to the screen (not shown in this figure) such that these two images join to create a composite image of the scene scanned as the array of infrared detectors 14 rotates through 360°.

Referring now to FIG. 4, there is shown, except for the housing 8 and optics mounted therein, the rotating portion of the system. Shown in this figure is a dewar 40 in which the array of infrared detectors 14 is mounted. The array of infrared detectors 14 is not visible in this view. The dewar 40 is secured to one end of a Stirling cycle refrigerator 41. The dewar 40 also includes a cold finger 42 which extends through the neck of the dewar 40 and attaches to the Stirling cycle refrigerator 41. The array of infrared detectors 14 is mounted on this cold finger. Positioned around this Stirling cycle refrigerator 41 is a heat exchanger 43. Air is circulated through the heat exchanger 43 to remove heat from the Stirling cycle refrigerator 41. A mounting member 44 is positioned around the heat exchanger 43. The outside of mounting member 44 includes a series of flat surfaces 45.

Positioned on each of the flat surfaces 45 is a motherboard 50 although only one is shown for purposes of illustration. A series of connectors 51 are mounted on each motherboard 50. One end of each of the motherboards 50 is coupled to a cable 52 which is in turn coupled to the emitter arrays 15 and 20.

The connectors 51 provide a convenient means whereby circuit cards 53 may be mounted. The circuit cards 53 are mounted by positioning the second half of connectors 51 on the card and plugging the two parts of connectors 51 together. The upper end of selected ones of the circuit cards 53 includes a second connector 54. The second portion of connector 54 is connected to a cable 55. Cable 55 interconnects the circuit cards 53 as required.

Circuit cards 53 are also mounted around the lower portion of the dewar 40. Each of these cards are plugged into motherboard 60 using connector 61. Motherboard 60 is interconnected with the array of infrared dedetectors 14, mounted in dewar 40, by a cable 62. A plurality of cables 62 are required, although only one cable 62 is illustrated, because circuit cards 53 are mounted along each of the flat portions 45 of the mounting 44. Since the circuit cards 53 rotate, means (not shown) to restrain the circuit cards 53 may be required.

FIG. 5, except for the optics housing 8 and optics mounted therein, is a cross-section of the rotating portions of the system illustrated in FIGS. 1 and 2. From FIG. 5 it can be seen that the dewar 40 is coupled to one end of the Stirling cycle refrigerator 41 and that the arrays of light emitting diodes 15 and 20 are coupled to the second end of the Stirling cycle refrigerator 41. Positioned around the Stirling cycle refrigerator 41 is heat exchanger 43. Around heat exchanger 43 is positioned mounting member 44, motherboard 50, and the circuit board 53. Coupled to the rotary portion of the system is the rotor 63 of a drive motor 69. The stator 64 of the drive motor 69 is coupled to the housing 65 of the system. A series of slip rings 70 provide a convenient means of supplying power and control signals to the system.

Also included in this view is a fan 71 for circulating cooling air through the heat exchanger 43 and over the circuit cards 53.

The output of the arrays of light emitters 15 and 20 are focused by projection lenses 16 and 17 onto a screen (not shown in this figure).

The system is shown in cross section in FIG. 6 along a line normal to the axis 35 of rotation. From this figure it can be seen that rows of circuit cards are symmetrically positioned with respect to the axis 35 of rotation. Power supplies 72 to provide power for operating the electronic components are also symmetrically positioned with respect to the axis 35 of rotation. The rotary components are mounted in a cylindrical inner housing 73 and the inner housing 73 is mounted in an outer housing 74 in an off-center relationship. This provides space between the inner housing 73 and the outer housing 74 for the cooling fans 71.

FIG. 7A illustrates typical rays A and B of infrared radiation entering the system directly. FIG. 7B illustrates the rays C and D of infrared radiation entering the system through the telescope. Shown in these diagrams is also a temperature reference 75 and its relative position with respect to the spherical mirror 32. The temperature reference is used for restoring the DC component of the video signals and will be explained in detail later.

As shown in FIGS. 7A and 7B, rays A and B entering directly, do not impinge on any portion of the spherical mirror 32 while rays C and D entering through the telescope impinge upon the spherical mirror 32 where they are reflected through lens 13 and impinge upon the detector array 14.

Figure 8:
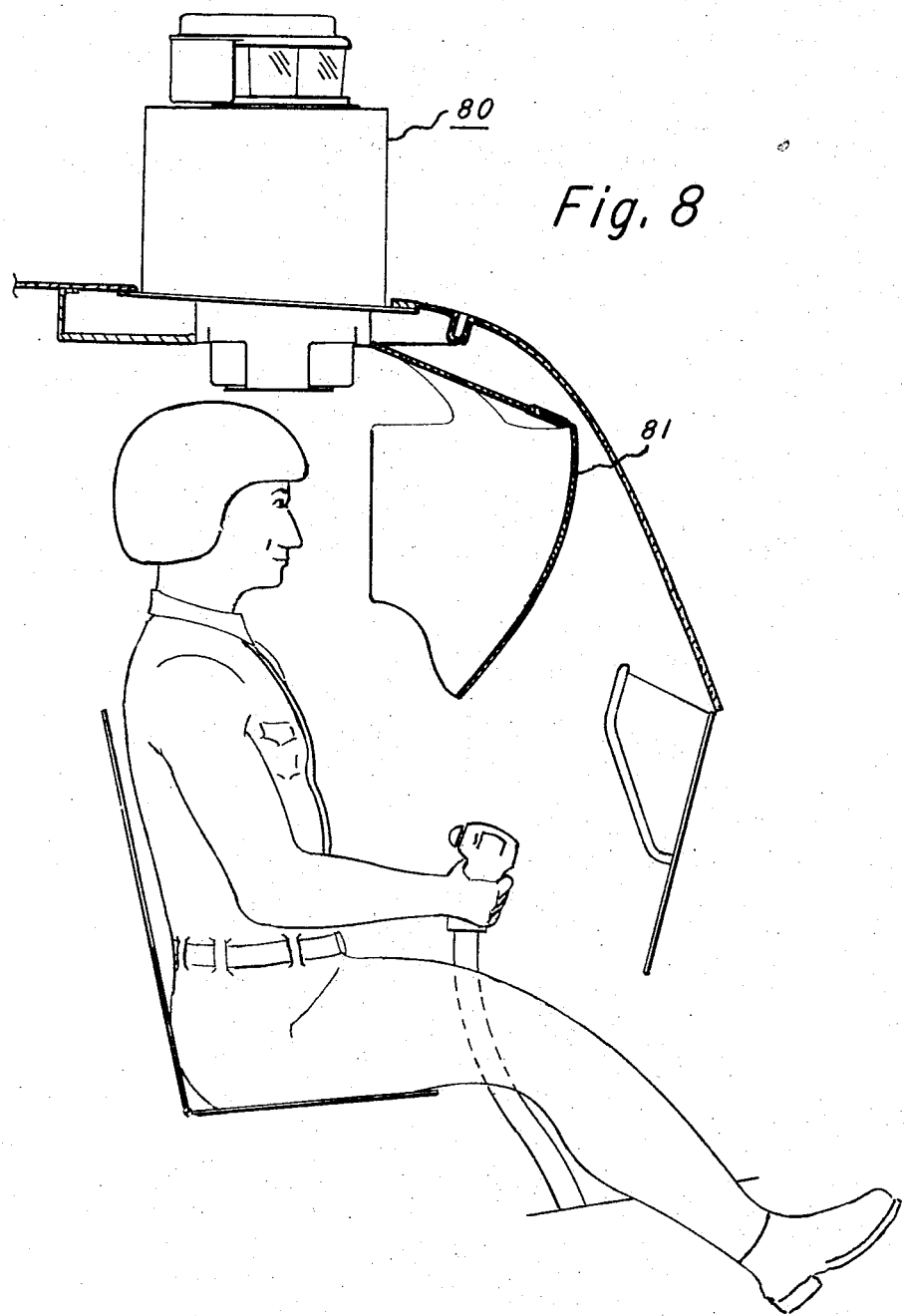
FIG. 8 is a drawing showing the relationship between the viewing system, the screen and the operator of the vehicle.

FIG. 8 illustrates the position of the system 80 with respect to the operator of the vehicle. The system 80 would normally be mounted through the roof of the vehicle and the display screen 81 would be positioned in front of the operator. The display screen 81 is circular in the horizontal plane and elliptical in the vertical plane to focus the energy impinging the display screen 81 near the eyes of the operator. The surface of the screen 81 may also be slightly uneven to diffuse the energy slightly so that the operator may move his head slightly without causing an apparent reduction in the intensity of the image.

Figure 9:
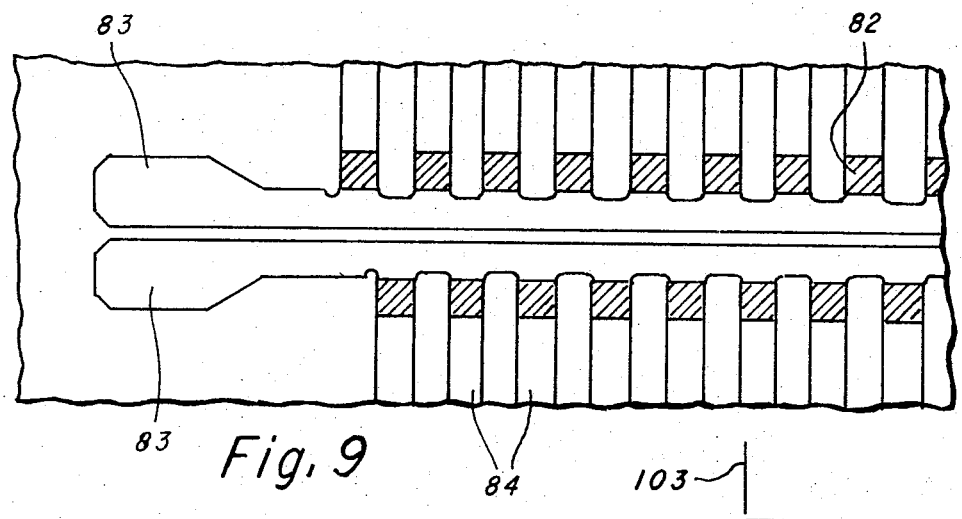
FIG. 9 is a plan view of an array of diodes.

FIG. 9 illustrates a plan view of an array of diodes suitable for use as either the array of infrared detectors 14 or the arrays of light emitters 15 and 20. The diodes comprising these arrays are constructed as a matter of convenience in two groups with a common cathode connection 83 for each group, individual anode connections 84 and with semiconductor areas 82 forming the individual diodes.

The array illustrated in FIG. 9 is suitable for use as either the array of infrared detectors 14 or the array of light emitting diodes 15 and 20. However, in general, diodes comprising the arrays of light emitting diodes 15 and 20 will be physically larger than the diodes comprising infrared detector array 14. It should be emphasized that there is a 1 to 1 correspondence between the number of diodes in the array of infrared detectors 14 and in the arrays of light emitters 15 and 20. The resolution of the system is limited by the size of the diodes in the array of infrared detectors 14 with the smaller diodes providing a higher resolution.

The array of infrared detectors 14 can be made using mercury cadmium telluride semiconductor material while the arrays of light emitting diodes 15 and 20 can be formed by diffusion of impurities into gallium arsenide material.

Figure 10:
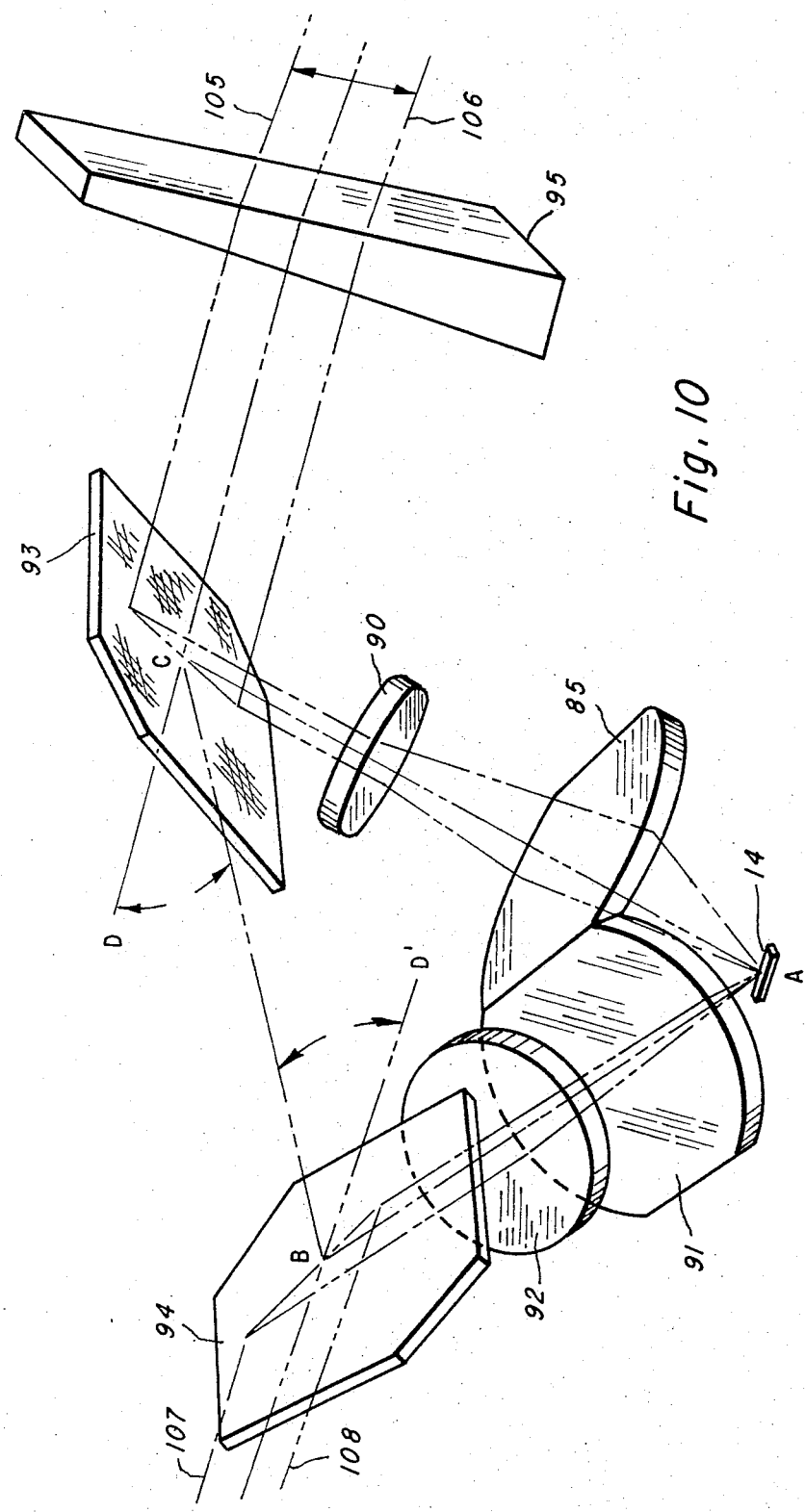
FIG. 10 is a pictorial view of the lens system used to focus infrared radiation on an array of detectors.

FIG. 10 illustrates an infrared optical system useable with the scanner illustrated in FIGS. 1 and 2. The infrared optics illustrated in FIG. 10 replaces lenses 25, 30 and 13 as well as mirrors 31, 12 and 27 of FIGS. 1 and 2.

The infrared optics illustrated in FIG. 10 includes two lens systems. The first lens system comprises lenses 85 and 90. The second lens system comprises lenses 91 and 92. Two typical parallel rays 105 and 106 of infrared radiation are shown entering the first lens system. These rays 105 and 106 are deflected by a prism 95, a mirror 93 and focused onto the array of infrared detectors 14 by lenses 85 and 90. Two typical parallel rays 107 and 108 of infrared radiation are shown entering the system through the second lens system. These rays are deflected by mirror 94 and focused on the array of infrared detectors 14 by lenses 91 and 92.

As previously discussed, the optics illustrated in FIG. 10 replaces the lenses and mirrors illustrated in FIGS. 1 and 2. When properly positioned in the system, the spherical mirror 32 will always shield one of the lenses so that infrared radiation enters the system from only one direction. The mirrors 93 and 94 are oriented such that rays 105 and 107 are positioned 180° from each other in the vertical plane. Prism 95 deflects parallel rays 105 and 106 downward such that the optical system scans the scene of interest in the manner previously explained with reference to FIGS. 1 and 2.

The output of the detector array 14 is a composite signal resulting from the infrared energy reflected by the spherical mirror 32 and also from the scene being scanned. The spherical mirror 32 is shielded such that variations in infrared radiation impinging thereon are minimized. Under these conditions substantially all the variations in infrared radiation arriving at detector array 14 comes from the scene being scanned.

The output signals of detector array 14 are then amplified and coupled to the arrays of light emitters 15 and 20 as previously explained with reference to FIGS. 1 and 2. The ouput of arrays of light emitting diodes 15 and 20 are projected onto the display screen by projection optics 17 and 16 to produce an image of the scene scanned.

Figure 11:
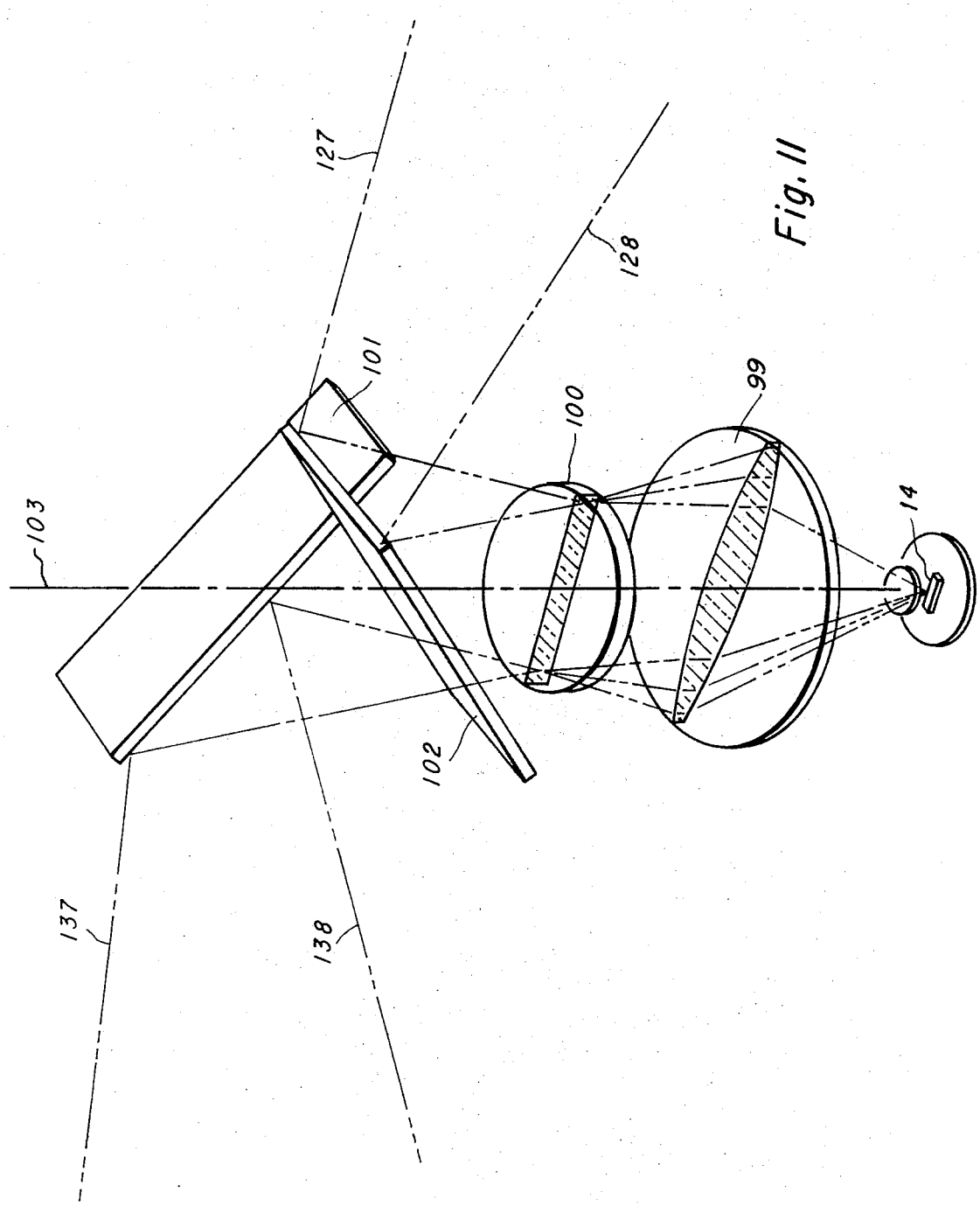
FIG. 11 is a pictorial view of a lens and mirror system used to split the field of view of the array of infrared detectors into two equal parts.

FIG. 11 illustrates another optical system suitable for use in the disclosed scanner system. This optics system replaces lenses 25, 30 and 13 as well as mirrors 31, 12, and 27 of FIGS. 1 and 2.

The optical system illustrated in FIG. 11 comprises lenses 99 and 100 which focus infrared radiation onto the array of infrared detectors 14. The field of view of the detector array 14, as projected through lenses 99 and 100 is divided into two parts by mirrors 101 and 102. Mirrors 101 and 102 are positioned such that the two parts of the field of view of the detector array 14 are 180° with respect to each other in the vertical plane and less than 180° in the horizontal plane.

First and second rays 127 and 128 of infrared radiation are shown entering the system and impinging on mirror 102. These rays are focused onto the detector array 14. Third and fourth rays 137 and 138 are shown entering the system and impinging on mirror 101 where they are deflected and focused on the detector array 14 by lenses 95 and 100. The angles of mirrors 101 and 102 are adjusted such that the angle of rays 128 and 127 are substantially the same with respect to the optical axis 103.

The optical systems shown in FIG. 11 replaces the lenses and mirrors illustrated in FIGS. 1 and 2. The spherical mirror 32 blocks one of the fields of view. As the system rotates, the system scans the scene of interest in two parts. The first part consists of the area between rays 127 and 128. The second part consists of the areas between rays 137 and 138.

The output signal of the detector array 14 is a result of the infrared radiation from the spherical mirror 32 and from the scene being scanned. Very little variation in infrared radiation is received from the spherical mirror 32, therefore substantially all the output signal of the detector array 14 is a result of infrared radiation from the scene being scanned.

The output signal is amplified to produce signals to drive two arrays 15 and 20 of light emitting diodes. The output of these arrays is focused on a display screen by focusing optics 16 and 17 to create an image of the scene being scanned. The operation of the arrays of light emitting diodes and the projection apparatus was previously described with reference to FIG. 1.

Figure 12:
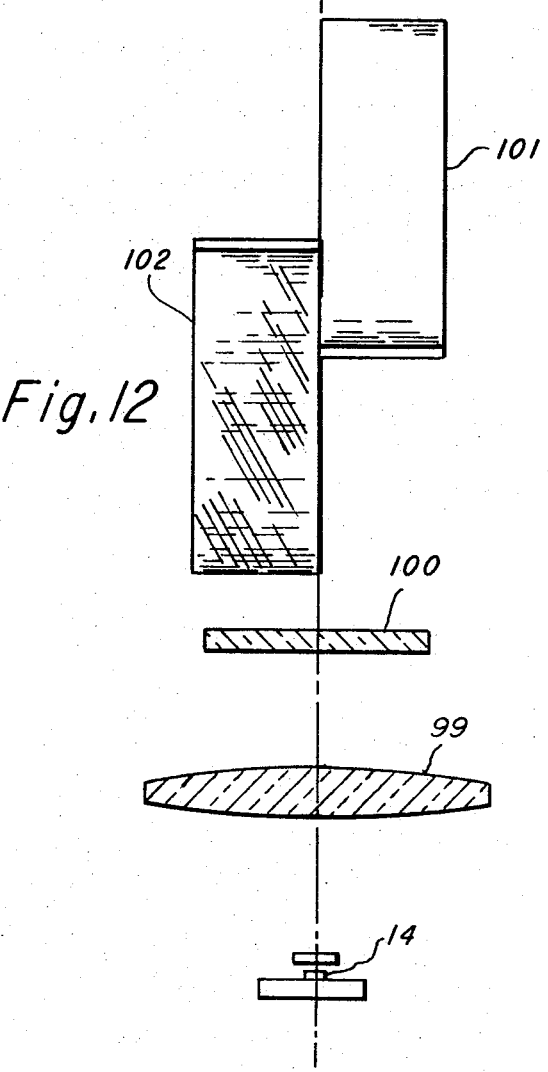
FIG. 12 is a side view of the lens and mirror system illustrated in FIG. 11.

FIG. 12 is a two dimensional view of the infrared optic system illustrated in FIG. 11. This view illustrates how mirrors 101 and 102 are positioned with respect to the optical axis 103 in order to split the field of view of the array of infrared detectors 14 into two parts.

If the infrared optical systems illustrated in the figures are used in the systems illustrated in FIGS. 1 and 2, the spherical mirror 32 may be replaced by a constant infrared energy source. A spherical mirror is one example of such a source since it allows energy impinging upon detector array 14 to originate from points on the rotating assembly which are fixed relative to the rotating assembly.

Figure 13:
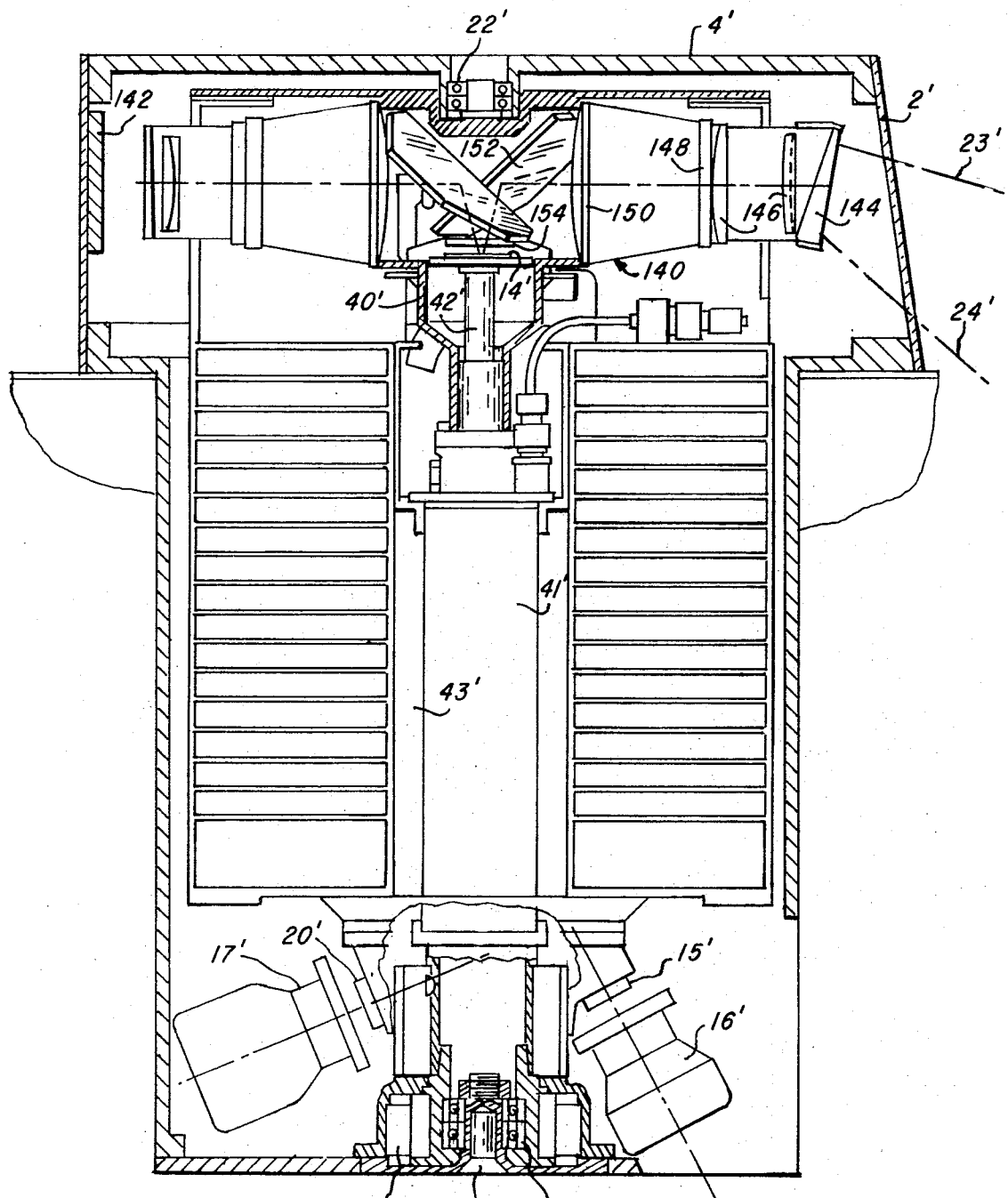
FIG. 13 is a cross-section of the two lens systems embodiment of the invention utilizing the uniform temperature radiating surface of the system housing for selective inactivation of one of the two lens systems with the optics for the low angle field of view in the operative position.
Figure 14:
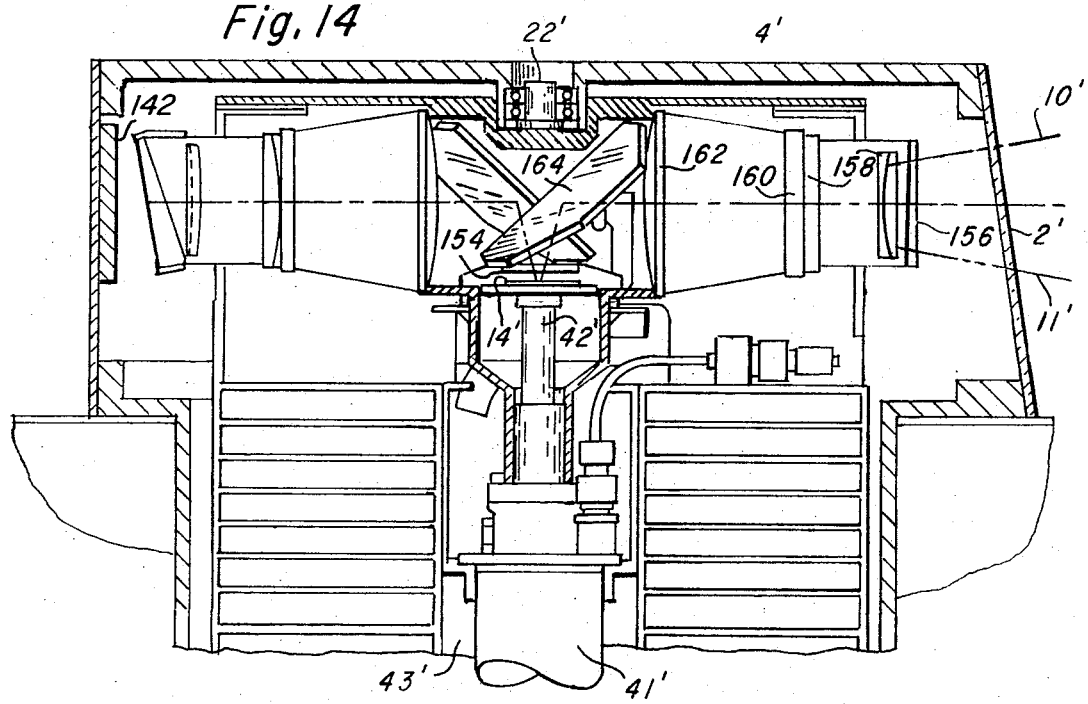
FIG. 14 is a fragmented cross section of the embodiment of FIG. 13 with the optics for the high angle field of view in the operative position.

Referring now to FIGS. 13 and 14, there are illustrated modifications of FIGS. 1 and 2, respectively, and common elements are designated with the corresponding numbers of FIG. 1, in combination with a prime.

Upper and lower optical systems for viewing upper and lower portions of a field of view are mounted in opposite arms of a cross-member of a tubular T-shaped housing 140 (FIG. 13). The T-shaped housing 140 is rotatably mounted in housing 4' on bearings 21' and 22' in axial alignment with the vertical member of the T-shaped housing 140. The housing 4' has a forward looking window 2' having ends terminating adjacent ends of a substantially uniform temperature radiating body or coating 142. The forward looking window 2' may be made, for example, of polyethylene or germanium for admitting radiant energy and preferably provides a 170° field of view although any field of view up to 360° is considered possible with this embodiment. The uniform temperature radiating body of coating 142 may be a polyurethane rubber, sold under the trademark Scotchfoam by Minnesota Mining and Manufacturer Company, and is attached to the interior of housing 2'. The uniform temperature radiating body 142 is concentrically shaped with the arc of the rotating crossmember of the T-shaped housing and is positioned adjacent the path of rotation for inactivating the upper or lower optical systems as they pass looking at it.

As shown in FIG. 13, radiant energy from the scene being viewed is shown entering the lower viewing optical system through the window 2' as ray bundles 23' and 24'. The upper viewing optical system is shown (FIG. 13) looking at the uniform temperature radiating body 142. The lower viewing optical system includes a wedge shaped prism 144, an afocal lens system 146, a main imaging lens 148, a converging lens 150, and a fold mirror 152. The wedge shaped prism 144 may be, for example, a germanium wedge having the cross section of a truncated triangle. The wedge deflects the line of sight of the object field to the amount required for the lower portion of field coverage. The afocal lens system 146 is a 1.5X afocal demagnifying lens system which demagnifies the field of view from about 25° to about 16.7°. The main imaging lens 148 is a generalized aspheric direction plate located at the stop of the system. Converging lens 150 is a positive converging lens which forms a curved image format which is reflected by the mirror 152 through dewar window 154 to the detector array 14'.

Referring to FIG. 14, upon 180° rotation of the T-shaped housing 140, radiant energy from the scene being viewed is shown entering the upper viewing optical system through the window 2' as ray bundles 10' and 11', and the lower viewing optical system is shown looking at the uniform temperature radiating body 142. The upper viewing optical system is substantially identical to the lower viewing optical system in that it includes a wedge shaped prism 156, an afocal lens system 158, a main imaging lens 160, a converging lens 162, and a fold mirror 164. The only difference is in the configuration of the wedge shaped prism 156 which is configured and positioned in the end of the array of the cross member to deflect the line of sight to cover the upper field of view. As the other elements are identical as above described for the lower viewing optics system no further description is necessary. The ray bundles 10' and 11' pass through the optical elements to the detector array 14' which is mounted upon the cold finger 42'.

Returning to FIG. 13, the dewar 40', cold finger 42', Stirling cycle refrigerator 41', and the projection system complete the upright portion of the T-shaped housing 140. As the dewar 40', a cold finger 42' and the Stirling cycle refrigerator 41' are standard items well known to those skilled in the art, no detailed description of these elements is considered necessary. The projection optics includes projectors 16' and 17' attached adjacent the lower end of the vertical member of the T-shaped member to rotate in synchronism with the upper and lower optical systems. The projector 16' receives light images of the lower field of view from the light emitting diode 15' and projector 17' receives light images of the upper field of view from the light emitting diode 20'. The light images are projected by the rotating projectors upon the wrap around display screen 81' attached to the housing 4'. As the projection optics are similar only one need be described in detail.

Figure 15:
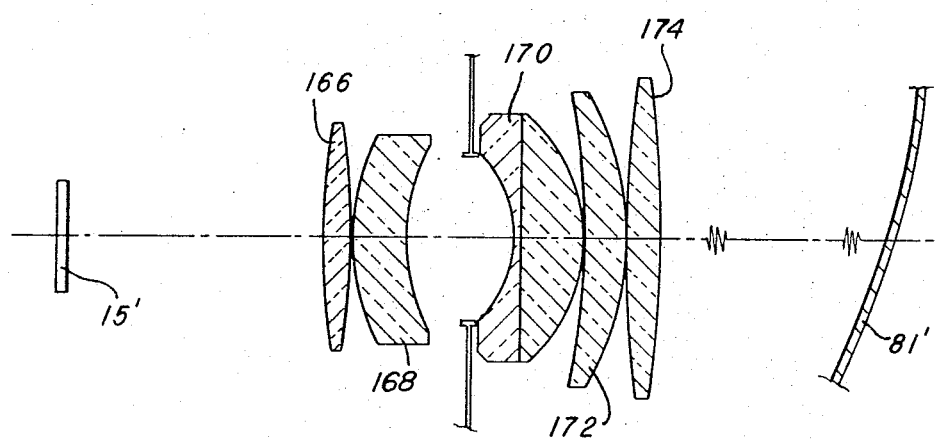
FIG. 15 is a pictorial view of the projection optics used in the field of view projectors.

Referring to FIG. 15 in which there is shown light from light emitter array 15' passing through: a biconvex lens 166, a diverging meniscus lens 168, a concave-convex lens 170, a converging meniscus lens 172 and a biconvex lens 174 to the display screen 81'. Lenses 166–170 act as a typical double configuration which co-act with lenses 172 and 174 to provide imagery onto the screen 81'. The display screen 81' is a tilted elliptical screen. Thus the emitter array 15' is tilted in the ratio of the magnification to the angular tilt of the elliptical screen for producing a true focused image on the display screen. The light emitting diodes provide outputs of one resolution width. As the tilted display screen 81' is not equally distant from the viewer's eye, different magnification heights and resolution widths at the screen surface is required to present a true image of the scene. Thus, the parameters of the projector optics are different and are as shown in TABLE I as follows:

TABLE I

| CONFIGURATION | MAGNIFICATION | FOCAL LENGTH | F NO. |
|---|---|---|---|
| 16' | 4.0 | 4.87 | 1.7 |
| 17' | 5.25 | 4.969 | 1.53 |

Figure 16:
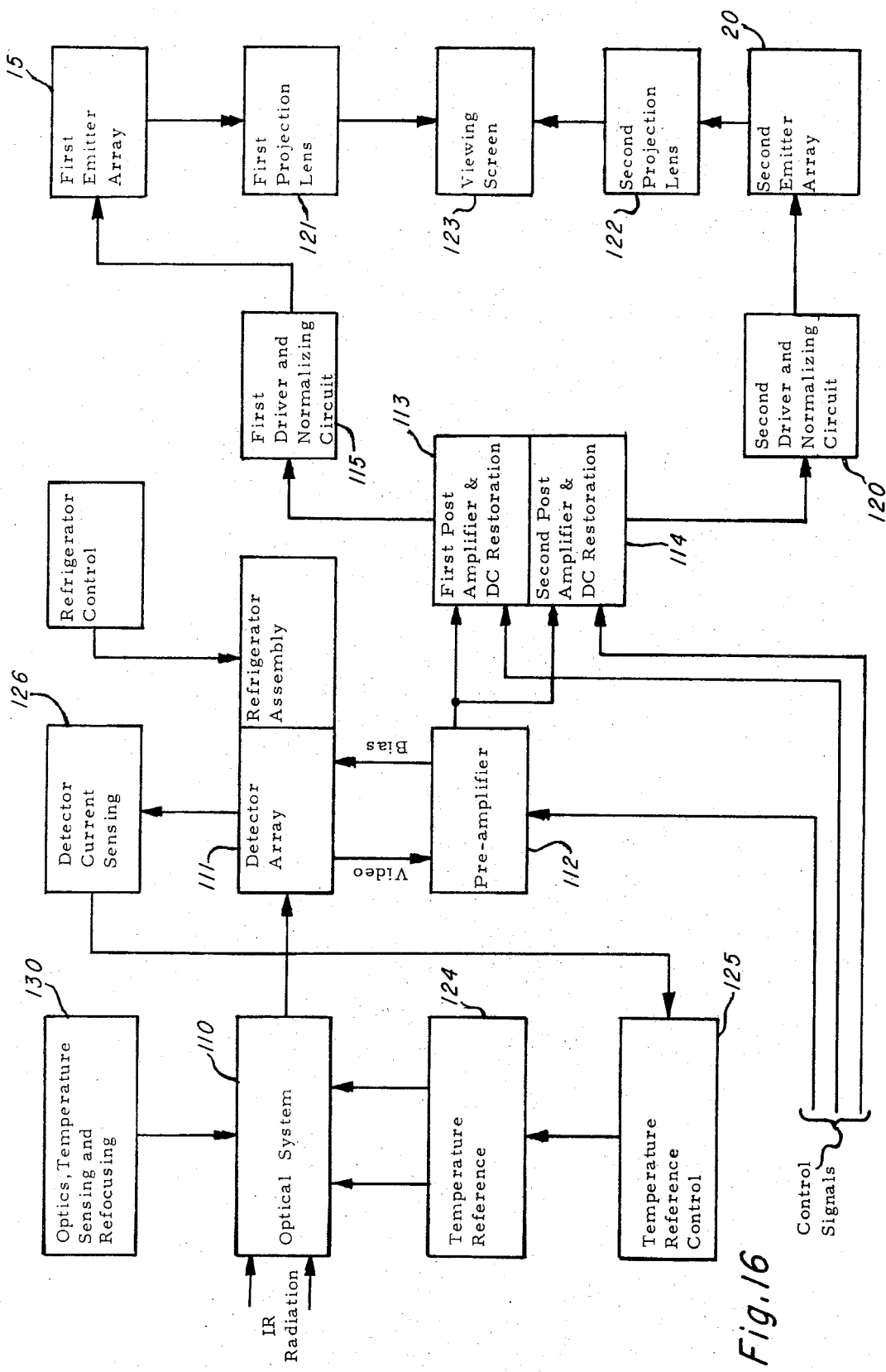
FIG. 16 is a block diagram of the viewing system.

The function of the entire system including the electronics, together with the operation of the entire system will now be explained with reference to the functional block diagram illustrated in FIG. 16. In this figure infrared radiation enters through optical system 110 and impinges upon the detector array 111. The detector array 111, as previously explained comprises a series of diodes sensitive to infrared radiation. Each of these diodes requires a bias signal and generates video signals indicative of the infrared radiation impinging it. The bias signal to each of the diodes is supplied by a preamplifier 112. The video signals are also amplified by preamplifier 112. The video output signals of the preamplifier 112 are coupled to first and second post-amplifiers 113 and 114. The output of the post amplifiers is coupled to first and second driver and normalizer circuits 115 and 120. The function of these normalizer circuits 115 and 120 is to adjust the gain of each of the individual channels driving the diodes of the emitter arrays 15 and 20, so that background of the display will be uniform. The outputs of the emitter arrays 15 and 20 are projected onto a display screen 123 by first and second lens systems 121 and 122.

As previously discussed, the first projection lens 121 focuses the output of the first emitter array 15 onto the upper portion of the display screen 123 to create a first portion of the display while the second projection of lens 122 focuses the energy from the second array 20 onto the lower portion of the display screen 123 to complete the display. The two images are joined to create an image of the entire scene scanned.

The output signals of the detector array 111 are DC signals with AC components indicative of the change in the infrared radiation arriving at the diodes comprising the infrared detector array 14. The DC components of the signals are relatively large compared to the AC components making the amplication of these signals in a direct coupled amplifier impractical. Therefore the preamplifier circuit 112 as an AC coupled amplifier, the DC components of the signals of the infrared detector array 111 are restored in the post amplifier circuits 113 and 114.

DC restoration is accomplished by positioning a temperature reference source 124 such that it is periodically within the field of view of the detector array 111. The average current of the detector array 111 is sensed by a detector current sensor 126 during two periods, one when the detector array 111 is receiving infrared radiation from the temperature reference source 124. These measurements are compared in the temperature reference control circuit 125 and the temperature of the temperature reference 124 adjusted such that these two current measurements result in substantially equal values. This is necessary to avoid the generation of large differential signals when the field of view of the detector array 111 is deflected from the scene being scanned to the temperature reference 124. If large differential signals were generated, the amplifier circuits could be saturated and the operation of the entire system impaired.

DC restoration is accomplished by clamping the output of the preamplifier circuit 112 to a known value during the time when the detector array 111 is receiving infrared radiation from the temperature reference 124. The most convenient value to clamp the signals to is ground. Clamping the output of the preamplifier 112 to ground in this manner restores the DC component of the video output signals of the preamplifier 112. The output signals of the preamplifier 112 are further amplified in the post amplifier circuits 113 and 114 and the driver and normalizing circuits 115 and 120.

The preamplifier 112 also includes a gain control for each of the video channels. Control signals from the system control panel are also coupled to the post amplifiers 113 and 114 and to the preamplifier 112 to permit the contrast and the gain of the system to be adjusted.

The temperature reference 124 may be a thermoelectric cooler mounted on a heat sink. The temperature of the heat sink is maintained at the desired value by passing current through the thermoelectric cooler in one direction to cool the heat sink. Passing current through the thermoelectric cooler in the opposite direction increases the temperature of the heat sink. The temperature reference control 125 controls the current through the thermoelectric cooler to maintain the temperature at the desired value.

The lens used in the various embodiments of the invention may be made of either germanium or Irtran-2 which is pressed sintered zinc sulfide available from Eastman Kodak Company, Rochester, N.Y.

The optical system 110 is automatically adjusted to compensate the lenses for change in focus due to change in temperature by an optics temperature and refocusing circuit 130. This permits accurate focusing to be maintained over a temperature change of about 50° to 130°F.

All the discussed embodiments of the invention may be modified to scan 360° by removing the spherical mirror 32 and removing one of the arrays of light emitting diodes as well as one of the infrared optical systems and one of the diode array projection optical systems.

A modification of the optical system shown in FIG. 11 may be used wherein the two mirrors 101 and 102 would be replaced with a single mirror oriented such that rays similar to 137 and 138 of FIG. 11 would impinge upon a modified version of the detector array 14 shown in FIG. 9. The modified detector array would be configured such that the detector array 14 shown in FIG. 9 would be essentially divided into two equal parts along the length of the array and the modified detector array would consist of only one of these parts. The single mirror which replaced mirrors 101 and 102 would be indexed to cause an apparent shift of the scene being scanned. The shift would be in the direction of the long dimension of the modified detector array and the amount of shift would equal one detector instantaneous field of view. This would occur on alternate 360° of rotation of the rotating assembly. The indexing of the mirror would allow the optical system to scan a complete 360° field of view in two resolutions of the rotating assembly and would require a reduced amount of video processing circuitry compared to a non-indexed system using a similar optical system in conjunction with detector array 14. Similar indexing of the optical system used for the projection of the light emitting diode array would create the proper image of the scene being scanned. Another modification of the system would be to adapt the system to a fire control role for controlling and ehancing the accuracy and effectiveness of weapons such as machine guns, rockets and cannons. In this role a fire control reticle will be provided which would provide a bore sight for the onboard weapons. Other modifications will also be clear to those skilled in the art.

What is claimed is:

1. An apparatus for detecting radiant energy from a scene and displaying an image thereof comprising:
   a. a first housing rigidly attached to a support member, said housing having a radiant energy admitting window for admitting radiant energy from a field of view of a scene;
   b. a second housing rotatably mounted in said first housing;
   c. an optical system, a radiant energy detector means, and a transducer means mounted for synchronous rotation with said second housing, said optical system including means for selectively forming a first optical path from the window of the first housing for radiant energy emanating from a first portion of the scene of the field of view and a second optical path from the window of the first housing for radiant energy emanating from a second portion of the scene of the field of view, said radiant energy detector means positioned to receive radiant energy from the optical system and produce electrical representations thereof, and said transducer means operatively responsive to the electrical representations of the radiant energy detector means for producing a wide angle image of the field of view of the scene;
   d. a means for rotating the second housing for scanning the field of view of the scene; and
   e. a display means for displaying the image of the field of view of the scene.

2. A system for scanning a predetermined portion of the surface of the earth and for generating a display, comprising:
   a. a rotating support member,
   b. a detector means rigidly coupled to said rotating support member;
   c. an optical system having at least one scanning element angularly disposed to the field of view to define upon rotation a wide angle view, said scanning element coupled to and rotating with said rotating support member for collecting and focusing radiating energy alternately from first and second portions of the surface of the earth onto said detector means, said detector means alternately producing first and second electrical signals representative of radiant energy emanating from said first and second portions of said surface of the earth;
   d. A transducer means coupled to and rotating with said rotating support member in synchronism with said optical system responsive to said first and second electrical signals for producing first and second visual images of said first and second portions of the earth respectively;
   e. A projection means for alternately projecting the first and second visual images;
   f. a display screen for receiving the first and second visual images, said display screen configured to present a substantially true image of the scene; and
   g. a means for rotating the second housing for scanning the field of view and alternately projecting the first and second visual images at a rate to produce a combined wide angle visible display of the scene of the field of view on the display screen.

3. An apparatus for detecting radiant energy from a scene and displaying an image thereof comprising:
   a. a first housing rigidly attached to a support member, said housing having a radiant energy admitting window for admitting radiant energy from a field of view of a scene;
   b. a second housing rotatably mounted in said first housing;
   c. an optical system, a radiant energy detector means and a transducer means mounted for synchronous rotation with said second housing; said optical system including a prism, an afocal lens system, a main imaging lens, and a converging lens forming an optical path for the field of view, said prism operating to deflect the line of sight of the object field, said afocal lens system responsively operative to radiant energy passing the prism for demagnifying the field of view, said main imaging lens positioned to receive the demagnified field of view for reducing aberations, and said converging lens operative to focus the field of view on the detector array, said radiant energy detector means positioned to receive radiant energy from the optical system and produce electrical representations thereof, and said transducer means operatively responsive to the electrical representations of the radiant energy detector means for producing a wide angle image of the field of view of the scene;
   d. a display means for displaying the image of the field of view of the scene; and
   e. a means for rotating the second housing for scanning the field of view of the scene and writing the scene upon the display means.

4. A radiation detection apparatus comprising:
   a. a first housing rigidly attached to a support member, said housing having a radiant energy admitting window;
   b. a second housing rotatably mounted in said first housing, said second housing having a window aligned to rotate before the window of the first housing;
   c. first and second optical systems mounted for rotation with the second housing said first and second optical systems forming optical paths to first and second portions of a field of view of a scene, said optical systems including scanning and focusing means for alternately scanning radiant energy emanating from the first and second portions of the scene of the field of view;
   d. a plurality of detectors responsive to detected radiant energy to produce electrical representations of the detected radiant energy;
   e. a light emitting means mounted for rotation in said second housing in synchronism with the first and second optical systems to produce alternately light images of the electrical output of the plurality of detectors representing the radiant energy of the first and second optical systems;
   f. a means for rotating the second housing at a rate to produce a combined visible display of the scene of the field of view; and
   g. a display means for displaying the wide angle image of the scene.

5. An apparatus according to claim 4, wherein the scanning means of said first and second optical systems includes at least one mirror for alternately reflecting radiant energy and a focusing member for alternately focusing said mirror reflected radiant energy from said first and second portions of the scene onto said plurality of detectors.

6. An apparatus according to claim 5, wherein said optical system includes in its optical path first and second lenses with a first mirror optically coupled between first and second lenses, a second mirror positioned substantially near the focal point of said first and second lenses, and a third mirror fixed against rotation, said second and third mirrors receiving and reflecting radiant energy from the said first and second lenses such that said radiant energy impinges on the mirror of the scanning means of said first and second optical systems.

7. An apparatus according to claim 6 wherein said third mirror is a spherical mirror rigidly mounted in said first housing.

8. An apparatus according to claim 4, wherein said first and second optical systems include first and second mirrors to divide the field of view of said detector means into first and second portions, and focusing means including first and second lenses for focusing the radiant energy reflected by the first and second mirrors onto said plurality of detectors.

9. An apparatus according to claim 4, wherein said radiant energy is in the infrared portion of the electromagnetic spectrum.

10. An apparatus according to claim 4, wherein said second housing further includes first and second projection means for projecting said light images of said first and second optical systems onto the display means.

11. An apparatus according to claim 10, wherein said screen means is circular in one plane and elliptical in a second plane.

* * * * *